S. D. Engle.
Watch.

№ 2907 Reissued Mar. 31, 1868.

Witnesses;
J. W. Boughton
Wm Drum

Inventor
S. D. Engle
per Munn & Co
attorneys

United States Patent Office.

S. D. ENGLE, OF HAZLETON, PENNSYLVANIA.

*Letters Patent No.* 54,135, *dated April* 24, 1866; *reissue No.* 2,907, *dated March* 31, 1868.

IMPROVEMENT IN WATCHES.

The Schedule referred to in these Letters Patent and making part of the same.

TO ALL WHOM IT MAY CONCERN:

Be it known that I, S. D. ENGLE, of Hazelton, in the county of Luzerne, and State of Pennsylvania, have invented a new and useful Improvement in Watches; and I do hereby declare that the following is a full, clear, and exact description thereof, which will enable others skilled in the art to make and use the same, reference being had to the accompanying drawings, forming part of this specification.

The present invention mainly relates to the cases of that class of watches known as "hunting-watches," the object being to more perfectly exclude dust and dirt from the working parts or movement of the watch, it consisting in providing a separate and independent box or case from the ordinary watch-case for the movement of the watch, in which box the movement is secured in the usual manner now practised for fastening it in the watch-case, the said movement-box being fastened in the watch-case in any proper manner to allow it to be easily and readily removed therefrom when so desired. It also consists in so packing the apertures in the back plate or cap of the watch, through which the key adapted to the watch is inserted, for the purposes of winding up and setting the watch, that while no obstacle is presented to the free insertion therein and removal therefrom of such key, yet the entrance of dust or dirt through said apertures to the movement or working-parts of the watch will be entirely prevented. In the accompanying plate of drawings, my improvements in watches are illustrated—

Figure 1:
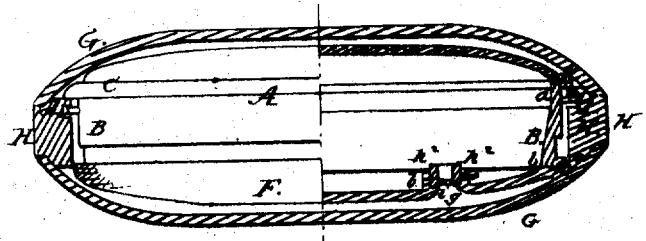

Figure 1 being a partial section and edge view of the movement-box or casing, with the ordinary watch-case shown in cross-section.

Figure 2:
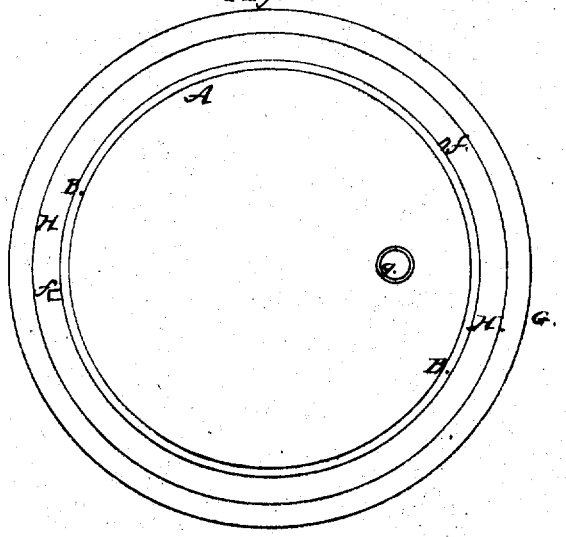

Figure 2, a view of one face of the watch, with the crsytal removed therefrom.

Similar letters of reference indicate corresponding parts.

A, in the drawings, represents my improved box or casing for a watch-movement. This box consists of a thin ring, B, made of suitable metal or other material of a sufficient size to embrace and enclose the periphery or edge of the watch-movement to which it is to be applied, and also of such a width as to slightly project beyond each of its faces or plates, between which the working parts are arranged, the watch-movement being secured in the ring B, in the usual manner now practised for securing it in any of the ordinary watch-cases, and therefore needing no particular description of it herein. Over the edge *a* of the ring B the rim or ring C, in which the crystal is secured, nicely fits, and over the other edge *b*, similarly fits the back plate or cap F, as in ordinary watch-cases. G, a watch-case, of the class employed for hunting-watches, it being constructed similarly thereto, in the central or body portion H of which the ring B of the watch-movement box is placed and confined by means of projecting studs or pins *c c c*, on and around the said ring B, which studs fit in an annular groove or recess, *d*, of the case-body H, suitable notches *f f* being made in the said body to allow the said studs to enter the body-groove *d*, before referred to.

By inserting the movement-box within the watch-case, as above explained, it is obvious that it cannot possibly become disengaged therefrom by the ordinary use of the watch, while at the same, when desired to remove the works, it can be readily and easily done.

From the above description it is readily apparent that by inserting the watch-movement within a box, separate and independent from the ordinary watch-case therefor, the entrance of dust to the works is, in a great measure, if not entirely, prevented, a quite important desideratum in watches, it being secured with but a trifling additional cost and increase in the size of the watch-case. In lieu of attaching the crystal ring and back plate or cap to the movement-ring B, as explained, they may be hinged to the main or body portion H of the watch-case, but in such a position that when closed they will fit over, as before, the projecting edges of the movement-ring B.

In addition to the above, my improvements, as before stated, relate to a packing, H, for the key-holes of the watch, it consisting in forming, around the key-hole *g*, and upon the under side of the back plate, in which it is made, a cup, *h*, by a raised lip or flange, $h^2$, in which it is fitted, a washer or bushing, *i*, made of buckskin or any other suitable material, adapted for a packing, having an aperture, *m*, through its centre, of sufficient size to allow the key to be placed in the watch, which bushing *i*, when the back plate is closed, fits against the back-movement plate around the spindle, upon which the key fits, thereby tightly closing and packing the key-hole, as is obvious, and thus preventing the entrance of dirt or dust to the watch-works. If a raised edge or lip is formed around the spindle upon which the watch-key is placed, as, for instance, in the watches made by the "American Watch Company," so known, the key-hole bushing then tightly packs the space between such raised lip and the under side of the case back plate, thus accomplishing the same result as before.

Having described my invention, I claim as new, and desire to secure by Letters Patent—

1. The employment of a box or supplemental case, B, to receive the movement of a watch, secured in the external or principal case of the watch, by means of studs or pins and a groove, for the purpose herein set forth.

2. I claim the cup $h$, with its flange $h^2$, and washer $i$, arranged with the key-hole $g$, in the manner and for the purpose herein described.

S. D. ENGLE.

Witnesses:

MAHLON ALLEBACH,

JOSEPH GRENAWALT.